US010634227B2

(12) United States Patent
Suzuki et al.

(10) Patent No.: US 10,634,227 B2
(45) Date of Patent: Apr. 28, 2020

(54) TORQUE CONVERTER

(71) Applicant: Toyota Jidosha Kabushiki Kaisha, Toyota-shi (JP)

(72) Inventors: Yuji Suzuki, Kariya (JP); Hiroyuki Amano, Susono (JP); Yu Miyahara, Susono (JP); Shuhei Horita, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 38 days.

(21) Appl. No.: 15/979,744

(22) Filed: May 15, 2018

(65) Prior Publication Data

US 2018/0328476 A1 Nov. 15, 2018

(30) Foreign Application Priority Data

May 15, 2017 (JP) .................................. 2017-096680

(51) Int. Cl.
*F16H 45/02* (2006.01)
*F16F 15/14* (2006.01)

(52) U.S. Cl.
CPC ........... *F16H 45/02* (2013.01); *F16F 15/145* (2013.01); *F16H 2045/0221* (2013.01); *F16H 2045/0263* (2013.01); *F16H 2045/0278* (2013.01)

(58) Field of Classification Search
CPC .................. F16H 45/02; F16H 15/145; F16H 2045/0221; F16H 2045/0278; F16H 2045/0263
See application file for complete search history.

(56) References Cited

U.S. PATENT DOCUMENTS

| 8,839,924 | B2 * | 9/2014 | Takikawa ................ F16H 45/02 |
| | | | 192/213.2 |
| 9,518,631 | B2 * | 12/2016 | Miyahara .............. F16F 15/145 |
| 2015/0005078 | A1 * | 1/2015 | Sekiguchi ............... F16H 45/02 |
| | | | 464/24 |

(Continued)

FOREIGN PATENT DOCUMENTS

| CN | 106468341 A | 3/2017 |
| DE | 10 2015 215 909 A1 | 2/2017 |

(Continued)

*Primary Examiner* — Thomas E Lazo
(74) *Attorney, Agent, or Firm* — Oblon, McClelland, Maier & Neustadt, L.L.P.

(57) ABSTRACT

A torque converter includes a housing, and a fluid-operated power transmitting portion and a vibration damping device which are accommodated within the housing and which are disposed around an axis such that the vibration damping device is located adjacent to the fluid-operated power transmitting portion in a direction of the axis, the torque converter further includes a space occupying member which occupies a part of a space formed within the housing and between the fluid-operated power transmitting portion and the vibration damping device. The space occupying member comprises a wall surface facing the fluid-operated power transmitting portion in the direction of the axis. A distance in the direction of the axis between a part of the wall surface and the fluid-operated power transmitting portion is smaller than a distance in the direction of the axis between the part of the wall surface and the vibration damping device.

11 Claims, 8 Drawing Sheets

(56) References Cited

U.S. PATENT DOCUMENTS

| | | | |
|---|---|---|---|
| 2015/0377320 A1 | 12/2015 | Miyahara et al. | |
| 2016/0053878 A1* | 2/2016 | Amano | F16H 45/02 |
| | | | 60/338 |
| 2016/0129910 A1* | 5/2016 | Amano | B60W 30/1882 |
| | | | 701/54 |
| 2017/0002908 A1* | 1/2017 | Saka | F16H 45/02 |

FOREIGN PATENT DOCUMENTS

| | | | | |
|---|---|---|---|---|
| DE | 102015215909 A1 * | 2/2017 | | F16D 3/12 |
| JP | 2016-011702 | 1/2016 | | |

\* cited by examiner

TORQUE CONVERTER

This application claims priority from Japanese Patent Application No. 2017-96680 filed on May 15, 2017, the disclosure of which is herein incorporated by reference in its entirety.

FIELD OF THE INVENTION

The present invention relates to a structure of a torque converter incorporating a vibration damping device.

BACKGROUND OF THE INVENTION

There is proposed a torque converter incorporating a vibration damping device of a pendulum type. JP-2016-11702A discloses an example of such a torque converter, wherein a vibration damping device is disposed between a fluid-operated power transmitting portion and a lock-up clutch.

By the way, the torque converter incorporating the vibration damping device as disclosed in JP-2016-11702A has a relatively large axial dimension. In this respect, this type of torque converter tends to have a relatively large volume of space (air gap) between the fluid-operated power transmitting portion and the vibration damping device. When a vehicle provided with the torque converter is initially turned on or started after the vehicle is held stationary for a long time, a working fluid within the torque converter is moved into a radially outer portion of the torque converter due to a centrifugal force, and stays in a space in the radially outer portion of the torque converter, so that the working fluid is less likely to flow into the fluid-operated power transmitting portion. As a result, it takes a relatively long time for the fluid-operated power transmitting portion to be filled with the working fluid, thereby giving rise to a problem of a relatively long time required to start up the vehicle.

SUMMARY OF THE INVENTION

The present invention was made in view of the background art described above. It is therefore an object of the present invention to provide a torque converter for a vehicle, which incorporates a vibration damping device and which is configured to permit the vehicle to start up in a relatively short time after the vehicle is held stationary for a long time.

The object indicated above is achieved according to the following modes of the present invention:

According to a first mode of the invention, there is provided a torque converter comprising a housing, and a fluid-operated power transmitting portion and a vibration damping device which are accommodated within the housing and which are disposed around an axis such that the vibration damping device is located adjacent to the fluid-operated power transmitting portion in a direction of the axis, the torque converter further comprising a space occupying member which occupies a part of a space formed within the housing and between the fluid-operated power transmitting portion and the vibration damping device. The space occupying member comprises a wall surface facing the fluid-operated power transmitting portion in the direction of the axis. A distance in the direction of the axis between at least a part of the wall surface and the fluid-operated power transmitting portion is smaller than a distance in the direction of the axis between at least the part of the wall surface and the vibration damping device.

According to a second mode of the invention, the torque converter according to the first mode of the invention is configured such that the space occupying member is a wall portion which is a part of a cover member covering the vibration damping device, which wall portion has a concave part recessed in a direction of the axis toward the vibration damping device, so as to accommodate a convex part of the fluid-operated power transmitting portion which projects in the direction of the axis toward the vibration damping device.

According to a third mode of the invention, the torque converter according to the first or second mode of the invention is configured such that the space occupying member is a wall portion which is a part of a cover member covering the vibration damping device, and a distance in the direction of the axis between at least the part of the wall surface and the fluid-operated power transmitting portion is smaller than a distance in the direction of the axis between a part of the wall portion and the vibration damping device.

According to a fourth mode of the invention, the torque converter according to the third mode of the invention is configured such that the wall portion at least partially overlaps with the fluid-operated power transmitting portion as seen in a radial direction of the fluid-operated power transmitting portion.

According to a fifth mode of the invention, the torque converter according to the fourth mode of the invention is configured such that the fluid-operated power transmitting portion has a convex part projecting in the direction of the axis toward the vibration damping device, while the wall portion has a concave part recessed in the direction of the axis toward the vibration damping device, so as to accommodate the convex p art.

According to a sixth mode of the invention, the torque converter according to the first mode of the invention is configured such that the space occupying member is an annular member attached to a cover member covering the vibration damping device.

According to a seventh mode of the invention, the torque converter according to the sixth mode of the invention is configured such that the annular member is attached to a wall portion of the cover member, which wall portion faces the fluid-operated power transmitting portion in the direction of the axis, and the annular member at least partially overlaps with the fluid-operated power transmitting portion as seen in a radial direction of the fluid-operated power transmitting portion.

According to an eighth mode of the invention, the torque converter according to the first mode of the invention is configured such that the space occupying member is an annular member attached to the housing which accommodates the fluid-operated power transmitting portion and the vibration damping device.

According to a ninth mode of the invention, the torque converter according to any one of the first through eighth modes of the invention is configured such that the fluid-operated power transmitting portion includes a pump impeller, and a turbine runner which is disposed so as to face the pump impeller in the direction of the axis such that the turbine runner is rotatable relative to the pump impeller. The vibration damping device includes a plurality of mass bodies, and a disc member which is rotated together with the turbine runner. The disc member has guide holes, and each of the mass bodies is held in engagement with a corresponding one of the guide holes such that each mass body can be oscillated within the corresponding guide hole in a circumferential direction of the disc member.

In the torque converter according to the first mode of the invention, a working fluid staying within the torque converter is moved into its radially outer portion due to a centrifugal force when a vehicle provided with the torque converter is started after the vehicle is held stationary for a long time. In this respect, it is noted that the space occupying member is disposed within the space formed between the fluid-operated power transmitting portion and the vibration damping device, so as to occupy a part of the space, so that the volume of the space in which the working fluid flows is reduced, whereby the working fluid which has been moved into the radially outer portion of the torque converter is forced by the space occupying member, to flow toward the fluid-operated power transmitting portion. As a result, the working fluid is delivered efficiently and primarily to the fluid-operated power transmitting portion, so that the vehicle can be quickly started.

According to the second mode of the invention, the space occupying member is the wall portion which is a part of the cover member covering the vibration damping device. Namely, the torque converter can be provided with the space occupying member disposed in the space between the fluid-operated power transmitting portion and the vibration damping device, without a need of increasing the number of required components of the torque converter.

According to the third mode of the invention, the distance in the direction of the axis between the part of the wall surface of the cover member covering the vibration damping device and the fluid-operated power transmitting member is smaller than the distance in the direction of the axis between at least the part of the wall portion and the vibration damping device. In this third mode of the invention wherein the space between the fluid-operated power transmitting portion and the vibration damping device is occupied by the wall portion of the cover member, so that the volume of the space in which the working fluid flows is reduced.

According to the fourth mode of the invention, the wall portion at least partially overlaps with the fluid-operated power transmitting portion as seen in the radial direction of the fluid-operated power transmitting portion, so that the volume of the space in which the working fluid flows can be further reduced.

According to the fifth mode of the invention, the wall portion of the cover member has the concave part, so that the cover member has a higher degree of rigidity than where the wall portion was otherwise formed so as to have a flat wall, whereby the required thickness of the cover member can be reduced. Further, the concave part of the wall portion which faces the convex part of the fluid-operated power transmitting portion so as to follow the convex part makes it possible to reduce a gap between the fluid-operated power transmitting portion and the cover member, thereby permitting further reduction of the volume of the space in which the working fluid flows.

According to the sixth mode of the invention, the space occupying member is constituted by the annular member attached to the cover member covering the vibration damping device. In the presence of the annular member, the volume of the space in which the working fluid flows is reduced.

According to the seventh mode of the invention, the annular member at least partially overlaps with the fluid-operated power transmitting portion as seen in the radial direction of the fluid-operated power transmitting portion, so that the volume of the space in which the working fluid flows can be further reduced.

According to the eighth mode of the invention, the annular member is constituted by the annular member attached to the housing. In the presence of the annular member, the volume of the space in which the working fluid flows is reduced.

According to the ninth mode of the invention, the mass bodies are oscillated within the respective guide holes, upon generation of a variation of a torque transmitted to the torque converter, so that the torque variation is damped, whereby the torque converter can be practically operated with a high degree of stability.

DETAILED DESCRIPTION OF PREFERRED EMBODIMENTS

Preferred embodiments of this invention will be described in detail by reference to the drawings. It is noted that the drawings are simplified or transformed as needed, and do not necessarily accurately represent the dimensions and shapes of various elements of the embodiments.

First Embodiment

Figure 1:
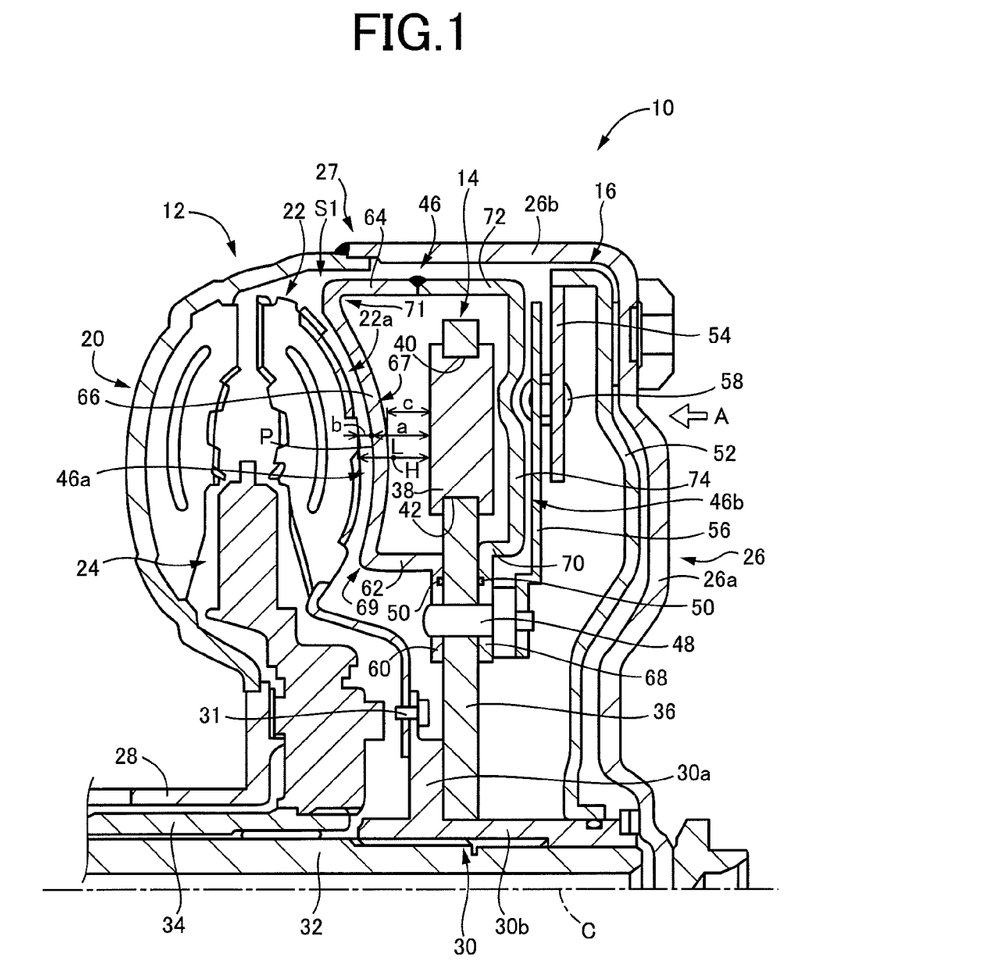
FIG. 1 is a cross sectional view of a torque converter according to a first embodiment of this invention.

Reference is first made to FIG. 1, which is the cross sectional view of a torque converter 10 according to a first embodiment of this invention. Since the torque converter 10 is substantially symmetrical with respect to an axis C of rotation, a lower half of the torque converter 10 is not shown in FIG. 1. The torque converter 10 is disposed in a power transmitting path between an engine and a transmission (not shown), and is a fluid-operated power transmitting device to transmit a drive force of the engine to the transmission through a working fluid.

The torque converter 10 is disposed rotatably about the axis C, and includes a fluid-operated power transmitting portion 12, a vibration damping device 14 of a pendulum type, and a lock-up clutch 16, which are arranged in the order of description in the direction of the axis C from the side of the transmission, namely, in the rightward direction as seen in FIG. 1. These fluid-operated power transmitting portion 12, the vibration damping device 14 and the lock-up clutch 16 are disposed adjacent to each other in the direction of the axis C.

The fluid-operated power transmitting portion 12 is disposed around the axis C, and is principally constituted by a pump impeller 20, a turbine runner 22 disposed so as to face the pump impeller 20 in the direction of the axis C, and a stator 24 interposed between the pump impeller 20 and the turbine runner 22. The pump impeller 20 and the turbine runner 22 are rotatable relative to each other.

The pump impeller 20 is an annular member having a generally arcuate shape in cross section, and has a plurality of vanes arranged in its circumferential direction. The pump impeller 20 is fixed at its radially outer end to an open axial end of a front cover 26 consisting of a bottom plate 26a and a cylindrical portion 26b, that is, to an open axial end of the cylindrical portion 26b. The pump impeller 20 and the front cover 26 are connected to each other fluid-tightly by welding over their entire circumferences, to prevent leakage of the working fluid from an interface therebetween. An outer cylindrical wall of the pump impeller 20 and the front cover 26 thus connected to each other cooperate with each other to form a housing 27 of the torque converter 10. Namely, the fluid-operated power transmitting portion 12, the vibration damping device 14 and the lock-up clutch 16 are accommodated within the housing 27. The pump impeller 20 is fixed at its radially inner end to a rotary member 28.

The turbine runner 22 is an annular member having a generally arcuate shape in cross section, and has a plurality of vanes arranged in its circumferential direction. The turbine runner 22 is fixed its radially inner end with rivets 31 to a collar portion 30a of a hub 30 disposed rotatably about the axis C. The hub 30 consists of the collar portion 30a in the form of a circular disc, and a cylindrical portion 30b connected to a radially inner end of the collar portion 30a. The cylindrical portion 30b is splined to an input shaft 32 of the transmission such that the cylindrical portion 30b is rotated with the input shaft 32.

The stator 24 is disposed between the pump impeller 20 and the turbine runner 22, and has a plurality of vanes arranged in its circumferential direction. The stator 24 is fixed at its radially inner end to an intermediate member 34 through a one-way clutch (not shown). The intermediate member 34 is a cylindrical member which is fixed to a stationary member and is therefore held stationary.

The vibration damping device 14 is disposed between the fluid-operated power transmitting portion 12 and the lock-up clutch 16 in the direction of the axis C. The vibration damping device 14 is of a pendulum type well known in the art, and includes a disc member 36 in the form of a circular disc, and a plurality of mass bodies 38 held by the disc member 36.

Figure 2:
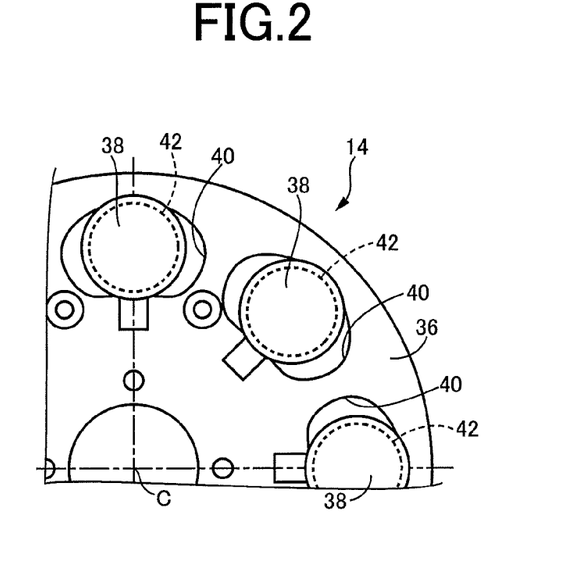
FIG. 2 is a side elevational view showing a circumferential portion of a vibration damping device of FIG. 1 taken in a direction of an arrow-headed line A in FIG. 1.

FIG. 2 is the side elevational view showing a circumferential portion of the vibration damping device 14 of FIG. 1 taken in a direction of an arrow-headed line A in FIG. 1. The disc member 36 takes the form of a circular disc having a suitable thickness, and is fixed at its radially inner end to the hub 30 with rivets (not shown), so that the disc member 36 is rotated about the axis C together with the hub 30 as a unit. The disc member 36 has a plurality of guide holes 40 equiangularly spaced apart from each other in its circumferential direction and formed arcuately in the circumferential direction.

Each of the mass bodies 38 takes the form of a circular disc having a larger thickness than the disc member 36, and has an annular U-groove 42 formed in its outer circumferential surface. The mass bodies 38 are held in the respective guide holes 40 of the disc member 36 such that the U-grooves 42 are held in engagement with peripheral walls of the guide holes 40, so as to prevent removal of the mass bodies 38 from the guide holes 40, and so as to permit the mass bodies 38 to move within the respective guide holes 40 in the circumferential direction of the disc member 36, along the peripheral walls of the guide holes 40, in the presence of a small amount of gap between the peripheral walls and the U-grooves 42.

The guide holes 40 and the mass bodies 38 which are located in a radially outer portion of the disc member 36 are covered by a cover member 46. The cover member 46 is an annular member fixed at its radially inner end to the disc member 36 with rivets 48. A sealing member 50 is interposed between mutually contacting surfaces of the cover member 46 and the disc member 36, to prevent a flow of the working fluid into the interior of the cover member 46. That is, the cover member 46 has a fluid-tight interior space, so that the mass bodies 38 in the fluid-tight interior space can be oscillated within the respective guide holes 40, without a resistance by the working fluid which would otherwise stay within the interior of the cover member 46. The structure of the cover member 46 will be described in detail.

The lock-up clutch 16 is disposed between the vibration damping device 14 and the bottom plate 26a of the front cover 26 in the direction of the axis C. The lock-up clutch 16 includes a piston 52, a first member 54 engaging the piston 52 such that the first member 54 is rotated with the piston 52, a second member 56 fixed to the disc member 36, and a plurality of damper springs 58 interposed between the first and second members 54 and 56.

The piston 52 is a cylindrical member disposed so as to face the bottom plate 26a of the front cover 26. The piston 52 is held at its radially inner end in sliding engagement with an outer circumferential surface of the cylindrical portion 30b of the hub 30. Further, the piston 52 is held at its radially outer end in engagement with a radially outer end of the first member 54 such that the piston 52 is rotated with the first member 54.

The first member 54 takes the form of a circular disc held at its radially outer end in engagement with the piston 52 such that the first member 54 and the piston 52 are rotated together as a unit. The first member 54 has a plurality of holes for accommodating the respective damper springs 58.

The second member 56 takes the form of a circular disc held at its radially inner end to the disc member 36 with the rivets 48. The second member 56 has a plurality of holes for accommodating the respective damper springs 58.

The damper springs 58 are accommodated within the holes formed in the first and second members 54 and 56, to operatively connect the first and second members 54 and 56 to each other.

A movement of the lock-up clutch 16 is controlled by a pressure of the working fluid within the torque converter 10. When the pressure of the working fluid acting on the piston 52 is raised, the piston 52 is moved in the direction of the axis C toward the bottom plate 26a of the front cover 26, so that the piston 52 is brought into pressing contact with the bottom plate 26a, whereby the lock-up clutch 16 is placed in a slipping state (partially engaged state) or a fully engaged state. As a result, a torque of the engine is partially or wholly transmitted to the input shaft 32 through the lock-up clutch 16. The torque of the engine transmitted to the input shaft 32 through the lock-up clutch 16 varies with a change of the pressure of the working fluid. The torque of the engine transmitted through the lock-up clutch 16 is transmitted to the input shaft 32 through the first member 54, the damper springs 58, the second member 56, the disc member 36 and the hub 30. In the process of transmission of the torque to the damper springs 58, the damper springs 58 are subjected to elastic deformation, so that a variation of the torque to be transmitted to the input shaft 32 can be reduced.

Then, the structure of the cover member 46 covering a radially outer portion of the vibration damping device 14 will be described. The cover member 46 is constituted by two members in the form of a first covering member 46a and a second covering member 46b. The first covering member 46a is disposed adjacent to the fluid-operated power transmitting portion 12, while the second covering member 46b is disposed adjacent to the lock-up clutch 16. The first and second covering members 46a and 46b are formed by press forming operations.

The first covering member 46a is an annular member having a bent cross sectional shape. The first covering member 46a consists of: a disc portion 60 in the form of a circular disc fixed to the disc member 36 with the rivets 48; an inner cylindrical portion 62 connected at its one axial end to a radially outer end of the disc portion 60 in the direction of the axis C; an outer cylindrical portion 64 located radially outwardly of the inner cylindrical portion 62; and a wall portion 66 in the form of a circular disc connecting the inner and outer cylindrical portions 62 and 64. The outer cylindrical portion 64 is located radially outwardly of and adjacent to the cylindrical portion 26b of the front cover 26. It is noted that the wall portion 66 of the cover member 46 has a surface facing the fluid-operated power transmitting portion 12.

The second covering member 46b is an annular member having a bent cross sectional shape. The second covering member 46b consists of: a disc portion 68 in the form of a circular disc fixed to the disc member 36 with the rivets 48; an inner cylindrical portion 70 connected at its one axial end to a radially outer end of the disc portion 68 in the direction of the axis C; an outer cylindrical portion 72 located radially outwardly of the inner cylindrical portion 70; and a wall portion 74 in the form of a circular disc connecting the inner and outer cylindrical portions 70 and 72. The outer cylindrical portion 72 is located radially outwardly of and adjacent to the cylindrical portion 26b of the front cover 26.

The outer cylindrical portion 64 of the first covering member 46a and the outer cylindrical portion 72 of the second covering member 46b are welded to each other over their entire circumferences, in a fluid-tight manner so as to prevent a flow of the working fluid into the interior of the cover member 46. The disc portion 60 of the first covering member 46a and the disc portion 68 of the second covering member 46b are fixed to the disc member 36 with the common rivets 48 such that the disc member 36 is sandwiched between the disc portions 60 and 68 in the direction of the axis C.

The wall portion 66 of the first covering member 46a has a concave shape in cross section in the direction of the axis C toward the vibration damping device 14, to accommodate the turbine runner 22 which has a convex shape in cross section in the direction of the axis C toward the vibration damping device 14. Described more specifically, the turbine runner 22 has a convex part 22a projecting in the direction of the axis C toward the lock-up clutch 16 (toward the vibration damping device 14), while the wall portion 66 which faces the turbine runner 22 (fluid-operated power transmitting portion 12) in the direction of the axis C has a concave part 67 recessed in the direction of the axis C toward the lock-up clutch 16 (toward the vibration damping device 14), so as to accommodate the convex part 22a. Namely, the wall portion 66 has the concave part 67 having a concave cross sectional shape substantially following a convex cross sectional shape of the turbine runner 22, so that the wall portion 66 does not interfere with the turbine runner 22. In this respect, it is noted that the wall portion 66 has a convex part 69 projecting in the direction of the axis C toward the fluid-operated power transmitting portion 12 (toward the turbine runner 22) such that a distance of projection of the convex part 69 increases as the wall portion 66 extends in the radially inward direction from an apex of the concave part 67, and also a convex part 71 projecting in the direction of the axis C toward the fluid-operated power transmitting portion 12 (toward the turbine runner 22) such that a distance of projection of the convex part 71 increases as the wall portion 66 extends in the radially outward direction from the apex of the concave part 67. Accordingly, a dimension of a gap between the turbine runner 22 and the wall portion 66 of the first covering member 46a in the direction of the axis C is held substantially constant in the radial direction of the first covering member 46a. Thus, the dimension of the gap is made smaller than where the wall portion 66 was otherwise formed so as to have a flat wall perpendicular to the axis C. Further, the wall portion 66 of the cover member 46 (first covering member 46a) partially overlaps with the fluid-operated power transmitting portion 12 in the direction of the axis, namely, as seen in the radial direction. It is noted that the wall portion 66 of the cover member 46 corresponds to a space occupying member which occupies a part of a space formed between the fluid-operated power transmitting portion 12 and the vibration damping device 14.

It is also noted that a distance "b" in the direction of the axis C between the fluid-operated power transmitting portion 12 and a part of a wall surface P of the wall portion 66 of the first covering member 46a which faces the fluid-operated power transmitting portion 12 in the direction of the axis C is smaller than a distance "a" in the direction of the axis C between the wall surface P and the mass bodies 38 of the vibration damping device 14, as shown in FIG. 1. That is, b<a. In other words, the part of the wall surface P of the wall portion 66 of the first covering member 46a facing the fluid-operated power transmitting portion 12 in the direction of the axis C is located on one side of a midpoint H of a distance L between the fluid-operated power transmitting portion 12 and the vibration damping device 14 in the direction of the axis C, which one side is on the side of the fluid-operated power transmitting portion 12. Further, the distance "b" in the direction of the axis C between the fluid-operated power transmitting portion 12 and the part of the wall surface P of the wall portion 66 is smaller than a distance "c" in the direction of the axis C between the wall portion 66 and the mass bodies 38 of the vibration damping device 14. That is, b<c. Accordingly, the wall portion 66 of the first covering member 46a occupies a part of a space S1 formed between the fluid-operated power transmitting portion 12 and the vibration damping device 14, whereby a volume of the space S1 in which the working fluid flows is made relatively small.

Further, a distance in the direction of the axis C between the wall portion 74 of the second covering member 46b and the lock-up clutch 16 is made relatively small, and a radial part of the wall portion 74 facing the damper springs 58 has a recess for preventing an interference of the wall portion 74 with the damper springs 58.

The outer cylindrical portions 64 and 72 of the cover member 46 are located in substantially the same radial position as the radially outer end of the turbine runner 22, and the radially outer end of the piston 52 of the lock-up clutch 16, namely, adjacent to the cylindrical portion 26b of the front cover 26 in the radial direction. Accordingly, the wall portion 66 of the cover member 46 is disposed within the space S1 formed between the fluid-operated power transmitting portion 12 and the vibration damping device 14, such that the wall portion 66 occupies a part of the space S1, so that the volume of the space S1 in which the working fluid flows is made relatively small. It is noted that the space S1 between the fluid-operated power transmitting portion 12 and the vibration damping device 14 is interpreted to include not only the space between the fluid-operated power transmitting portion 12 and the vibration damping device 14 in the direction of the axis C, but also the space left radially outwardly of these fluid-operated power transmitting portion 12 and vibration damping device 14.

There will be described advantages of the provision of the cover member 46 which covers the vibration damping device 14 as described above. Generally, a torque converter incorporating a vibration damping device tends to have a relatively large axial dimension, and a relatively large volume of space (air gap) formed therein. While a vehicle is held stationary for a long time, the working fluid gradually flows out of the torque converter 10, and an amount of the working fluid staying within the torque converter 10 is reduced. When the vehicle is turned on or started after the vehicle is held stationary for a long time, the working fluid within the torque converter 10 is moved into a radially outer portion of the torque converter 10 due to a centrifugal force. In the present torque converter 10, however, the wall portion 66 of the cover member 46 is disposed in the space S1 formed within the torque converter 10 (within the housing 27), between the fluid-operated power transmitting portion 12 and the vibration damping device 14, so that the volume of the space S1 in which the working fluid flows is reduced, whereby the working fluid which has been moved into the radially outer portion of the torque converter 10 is forced by the wall portion 66 of the cover member 46, to flow toward the fluid-operated power transmitting portion 12. As a result, the fluid-operated power transmitting portion 12 can be charged with the working fluid delivered from an oil pump, in a relatively short time, so that the vehicle can be quickly started.

Further, the wall portion 66 of the first covering member 46a has the concave part 67 accommodating the convex part 22a of the turbine runner 22 projecting in the direction of the axis C, so that the first covering member 46a has a higher degree of rigidity than where the wall portion 66 was otherwise formed so as to have a flat wall, whereby the required thickness of the first covering member 46a can be reduced, and the weight of the torque converter 10 can be reduced. Further, the concave part 67 of the first covering member 46a accommodating the convex part 22a of the turbine runner 22 makes it possible to reduce the gap between the fluid-operated power transmitting portion 12 and the cover member 46, thereby permitting a further increase of the volume within the cover member 46 which occupies the space S1. Accordingly, the space S1 in which the working fluid flows can be made further smaller so that the amount of the working fluid flowing into the fluid-operated power transmitting portion 12 is increased.

In addition, the wall portion 74 of the second covering member 46b also has the recess for preventing the interference with the damper springs 58, so that the second covering member 46b has a higher degree of rigidity than where the wall portion 74 was otherwise so as to have the flat wall, whereby the required thickness of the second covering member 46b can be reduced, and the weight of the torque converter 10 can be reduced.

Since the cover member 46 has the relatively large interior volume or space, a velocity of air flows generated by oscillating movements of the mass bodies 38 is reduced, so that a resistance to the oscillating movements is reduced, whereby a vibration damping effect of the mass bodies 38 can be improved. Further, this advantage can be obtained by simply designing the geometrical configurations of the first and second covering members 46a and 46b, and without an increase of the number of required components of the torque converter 10.

In the torque converter 10 according to the present embodiment, the working fluid staying within the torque converter 10 is moved into its radially outer portion due to the centrifugal force when the vehicle is started after the vehicle is held stationary for a long time. In this respect, it is noted that the cover member 46 is disposed within the space S1 formed between the fluid-operated power transmitting portion 12 and the vibration damping device 14, so that the volume of the space S1 in which the working fluid flows is reduced, whereby the working fluid which has been moved into the radially outer portion of the torque converter 10 is forced by the cover member 46, to flow toward the fluid-operated power transmitting portion 12. As a result, the working fluid is delivered efficiently and primarily to the fluid-operated power transmitting portion 12, so that the vehicle can be quickly started. Further, the cover member 46 covering the vibration damping device 14 functions as a space occupying member occupying a part of the space S1, so that the number of the required components of the torque converter 10 is not increased.

Other embodiments of the present invention will be described. It is to be understood that the same reference signs as used in the first embodiment will be used to identify the corresponding elements in the following embodiments.

Second Embodiment

Figure 3:
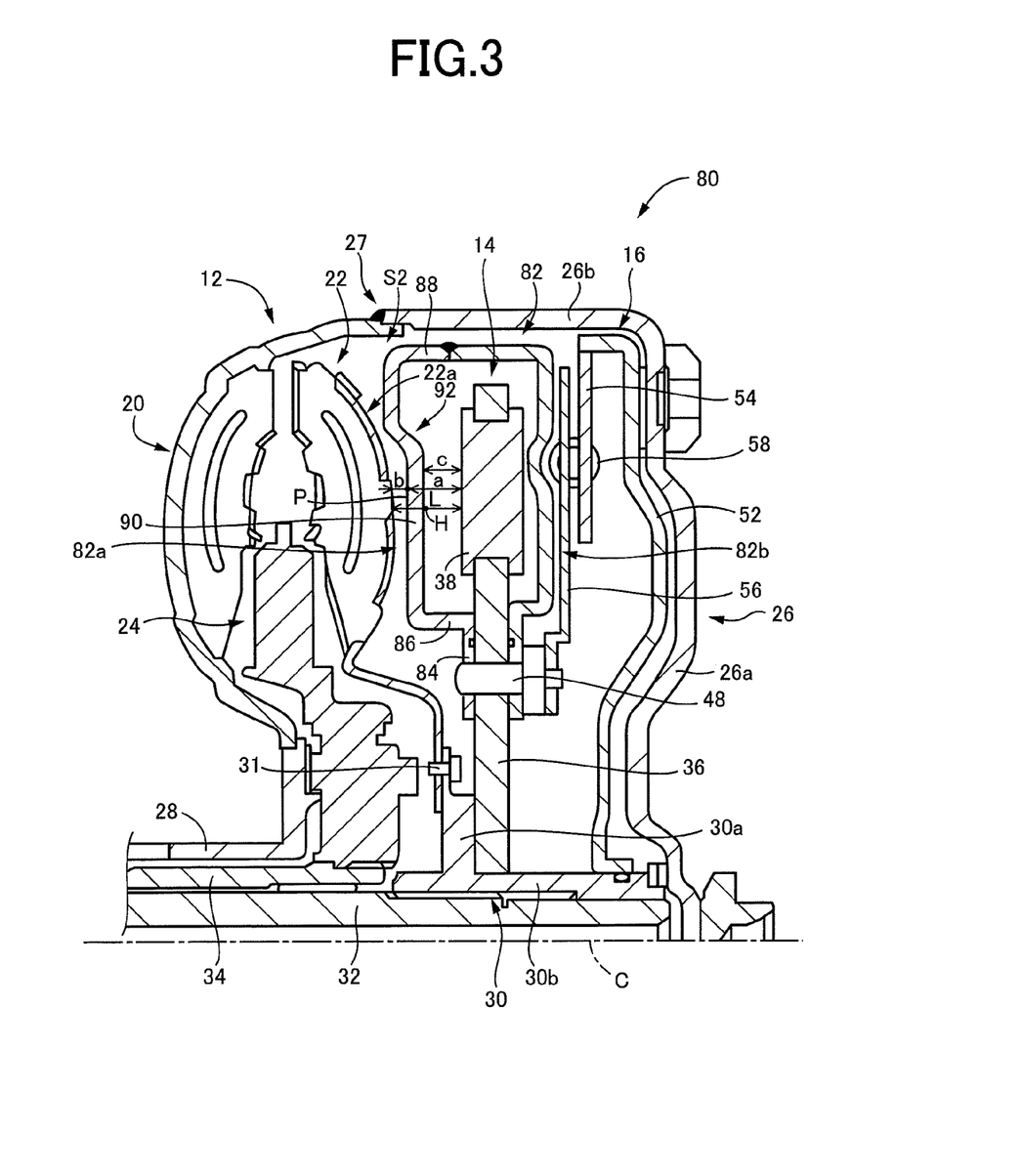
FIG. 3 is a cross sectional view of a torque converter according to a second embodiment of the invention.

FIG. 3 is the cross sectional view showing a torque converter 80 according to a second embodiment of the invention. The torque converter 80 is different from the torque converter 10, in respect of the structure of a cover member 82 covering the vibration damping device 14. The structure of the cover member 82 will be described.

The cover member 82 covering the vibration damping device 14 is constituted by two members in the form of a first covering member 82a and a second covering member 82b. The first covering member 82a is disposed adjacent to the fluid-operated power transmitting portion 12, while the second covering member 82b is disposed adjacent to the lock-up clutch 16.

The first covering member 82a is an annular member having a bent cross sectional shape. The first covering member 82a consists of: a disc portion 84 in the form of a circular disc fixed to the disc member 36 with the rivets 48; an inner cylindrical portion 86 connected at its one axial end to the radially outer end of the disc portion 84; an outer cylindrical portion 88 located radially outwardly of the inner cylindrical portion 86; and a wall portion 90 in the form of a circular disc connecting the inner and outer cylindrical portions 86 and 88. The outer cylindrical portion 88 is located radially outwardly of and adjacent to the cylindrical portion 26b of the front cover 26.

The second covering member 82b is an annular member having a bent cross sectional shape. The geometrical configuration of the second covering member 82b is the same as that of the second covering member 46b in the first embodiment, and will not be described in detail.

The first covering member 82a and the second covering member 82b are welded to each other over their entire circumferences, in a fluid-tight manner so as to prevent a flow of the working fluid into the interior of the cover member 46. The outer cylindrical portions of the cover member 82 are located in substantially the same radial position as the radially outer end of the turbine runner 22, and the radially outer end of the piston 52 of the lock-up clutch 16, namely, adjacent to the cylindrical portion 26*b* of the front cover 26 in the radial direction.

The wall portion 90 facing the fluid-operated power transmitting portion 12 in the direction of the axis C has a curved part 92 which is curved such that the curved part 92 extends toward the fluid-operated power transmitting portion 12 in the direction of the axis C as the curved part 92 extends in the radially outward direction. Accordingly, the part of the wall portion 90 radially outward of the curved part 92 is located closer to the fluid-operated power transmitting portion 12 than the part of the wall portion 90 radially inward of the curved part 92. In this respect, it is noted that the cover member 82 partly overlaps with the fluid-operated power transmitting portion 12 in the direction of the axis C, namely, as seen in the radial direction. Thus, the cover member 82 occupies a part of a space S2 formed between the fluid-operated power transmitting portion 12 and the vibration damping device 14, so that the volume of the space S2 in which the working fluid flows is reduced. It is noted that the wall portion 90 of the cover member 82 (first covering member 82*a*) corresponds to a space occupying member which occupies a part of a space formed between the fluid-operated power transmitting portion 12 and the vibration damping device 14.

It is also noted that a distance "b" in the direction of the axis C between the fluid-operated power transmitting portion 12 and a part of a wall surface P of the wall portion 90 of the first covering member 82*a* which faces the fluid-operated power transmitting portion 12 is smaller than a distance "a" in the direction of the axis C between the wall surface P and the mass bodies 38 of the vibration damping device 14, as shown in FIG. 3. That is, b<a. In other words, the part of the wall surface P of the wall portion 90 of the first covering member 82*a* facing the fluid-operated power transmitting portion 12 in the direction of the axis C is located on one side of a midpoint H of a distance L between the fluid-operated power transmitting portion 12 and the vibration damping device 14 in the direction of the axis C, which one side is on the side of the fluid-operated power transmitting portion 12. Further, the distance "b" in the direction of the axis C between the fluid-operated power transmitting portion 12 and the part of the wall surface P of the wall portion 90 is smaller than a distance "c" in the direction of the axis C between the wall portion 90 and the mass bodies 38 of the vibration damping device 14. That is, b<c. Accordingly, the wall portion 90 of the first covering member 82*a* occupies the part of the space S2 formed between the fluid-operated power transmitting portion 12 and the vibration damping device 14, whereby a volume of the space S2 in which the working fluid flows is made relatively small.

The torque converter 80 constructed as described above has the same advantages as the torque converter 10 of the first embodiment. In the torque converter 80 according to the present second embodiment, the volume of the space S2 formed between the fluid-operated power transmitting portion 12 and the vibration damping device 14 is reduced in the presence of the wall portion 90 of the cover member 82, whereby the working fluid which has been moved into the radially outer portion of the torque converter 80 due to the centrifugal force when the vehicle is started after the vehicle is held stationary for a long time is forced by the cover member 82, to flow toward the fluid-operated power transmitting portion 12, since the volume of the space S2 formed in the radially outer portion of the torque converter 80 is made relatively small. As a result, the length of time required for charging the fluid-operated power transmitting portion 12 with the working fluid can be shortened, so that the vehicle can be quickly started. Further, the wall portion 90 of the cover member 82 is curved, so that the cover member 82 has a higher degree of rigidity than where the wall portion 90 was otherwise formed so as to have a flat wall, whereby the required thickness of the cover member 82 can be reduced.

Third Embodiment

Figure 4:
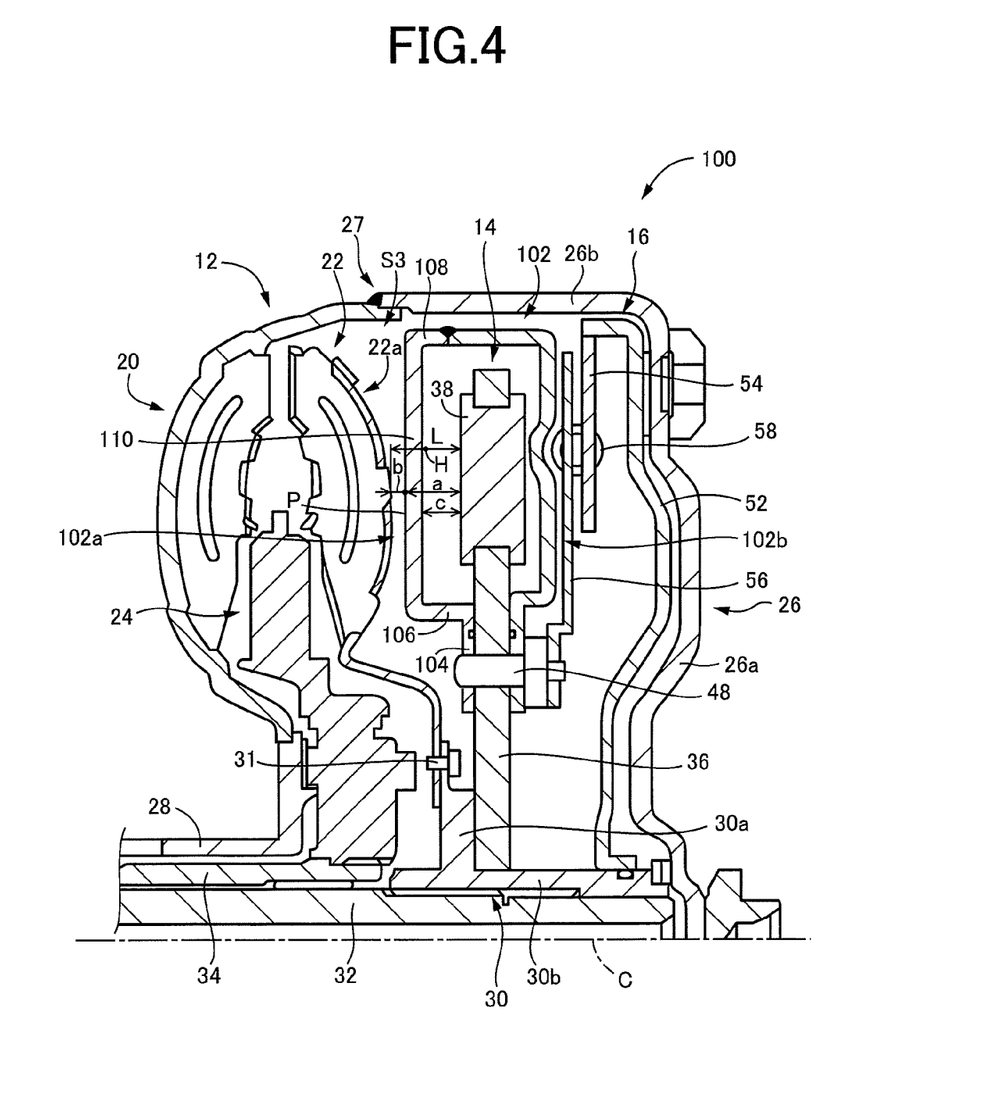
FIG. 4 is a cross sectional view of a torque converter according to a third embodiment of the invention.

FIG. 4 is the cross sectional view of a torque converter 100 according to a third embodiment of this invention. The torque converter 100 is different from the torque converter 10, in respect of the structure of a cover member 102. The structure of the cover member 102 will be described.

The cover member 102 covering the vibration damping device 14 is constituted by two members in the form of a first covering member 102*a* and a second covering member 102*b*. The first covering member 102*a* is disposed adjacent to the fluid-operated power transmitting portion 12, while the second covering member 102*b* is disposed adjacent to the lock-up clutch 16. The geometrical configuration of the second covering member 102*b* is the same as that of the second covering member 46*b* in the torque converter 10, and will not be described.

The first covering member 102*a* is an annular member having a bent cross sectional shape. The first covering member 102*a* consists of: a disc portion 104 in the form of a circular disc fixed to the disc member 36 with the rivets 48; an inner cylindrical portion 106 connected at its one axial end to a radially outer end of the disc portion 104; an outer cylindrical portion 108 located radially outwardly of the inner cylindrical portion 106; and a wall portion 110 in the form of a circular disc connecting the inner and outer cylindrical portions 106 and 108.

It is also noted that a distance "b" in the direction of the axis C between the fluid-operated power transmitting portion 12 and a part of a wall surface P of the wall portion 110 of the first covering member 102*a* which faces the fluid-operated power transmitting portion 12 is smaller than a distance "a" in the direction of the axis C between the wall surface P and the mass bodies 38 of the vibration damping device 14, as shown in FIG. 4. That is, b<a. In other words, the part of the wall surface P of the wall portion 110 of the first covering member 102*a* facing the fluid-operated power transmitting portion 12 in the direction of the axis C is located on one side of a midpoint H of a distance L between the fluid-operated power transmitting portion 12 and the mass bodies 38 of the vibration damping device 14 in the direction of the axis C, which one side is on the side of the fluid-operated power transmitting portion 12. Further, the distance "b" in the direction of the axis C between the fluid-operated power transmitting portion 12 and the part of the wall surface P of the wall portion 110 is smaller than a distance "c" in the direction of the axis C between the wall portion 110 and the mass bodies 38 of the vibration damping device 14. That is, b<c. Accordingly, the cover member 102 is disposed in a space S3 formed between the fluid-operated power transmitting portion 12 and the vibration damping device 14 and occupies a part of the space S3, whereby a volume of the space S3 in which the working fluid flows is made relatively small. It is noted that the wall portion 110 of the cover member 102 corresponds to a space occupying member which occupies a part of a space formed between the fluid-operated power transmitting portion 12 and the vibration damping device 14.

The torque converter 100 constructed as described above has the same advantages as the torque converters 10 and 80 of the first and second embodiments. In the torque converter 100 according to the present third embodiment, the volume of the space S3 formed between the fluid-operated power transmitting portion 12 and the vibration damping device 14 is reduced in the presence of the wall portion 110 of the cover member 102, whereby the working fluid which has been moved into the radially outer portion of the torque converter 100 due to the centrifugal force when the vehicle is started after the vehicle is held stationary for a long time is forced by the cover member 102, to flow toward the fluid-operated power transmitting portion 12, since the volume of the space S3 formed in the radially outer portion of the torque converter 100 is made relatively small. As a result, the length of time required for charging the fluid-operated power transmitting portion 12 with the working fluid can be shortened, so that the vehicle can be quickly started.

Fourth Embodiment

Figure 5:
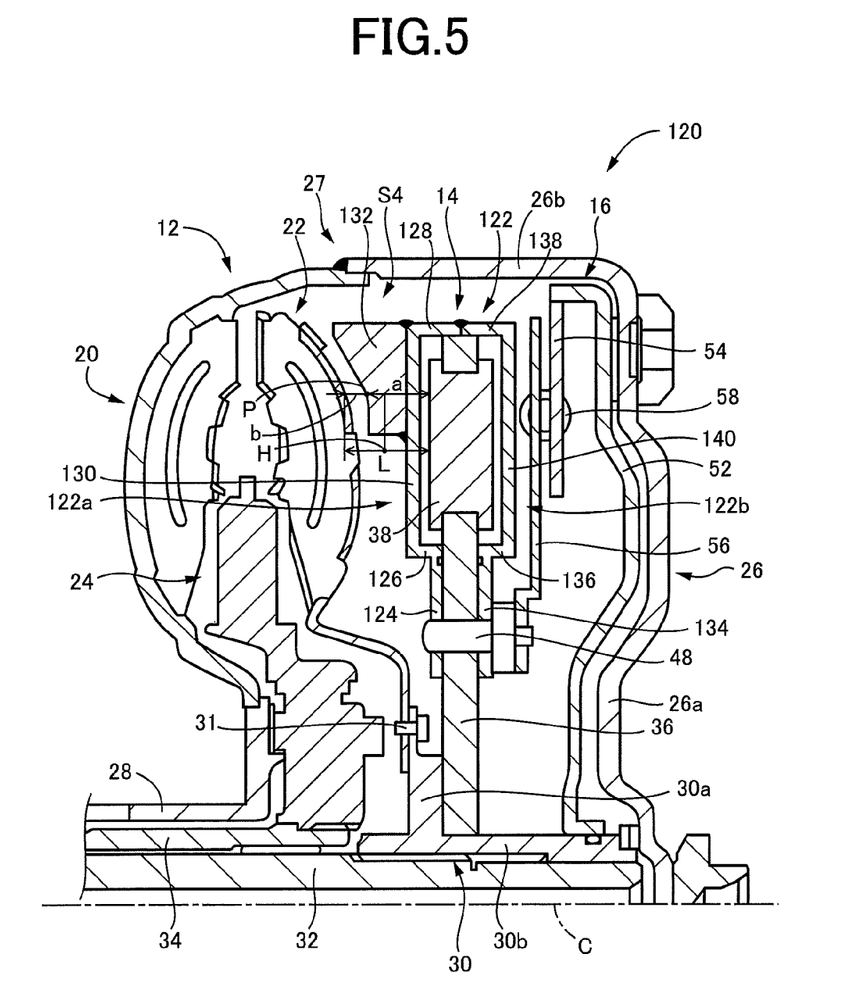
FIG. 5 is a cross sectional view of a torque converter according to a fourth embodiment of the invention.

FIG. 5 is the cross sectional view of a torque converter 120 according to a fourth embodiment of the invention. The torque converter 120 is different from the torque converter 10 in the first embodiment, in respect of the structure of a cover member 122 covering the vibration damping device 14. The structure of the cover member 122 will be described.

The cover member 122 covering the vibration damping device 14 is constituted by two members in the form of a first covering member 122a and a second covering member 122b. The first covering member 122a is disposed adjacent to the fluid-operated power transmitting portion 12, while the second covering member 122b is disposed adjacent to the lock-up clutch 16.

The first covering member 122a is an annular member having a bent cross sectional shape. The first covering member 122a consists of: a disc portion 124 in the form of a circular disc fixed to the disc member 36 with the rivets 48; an inner cylindrical portion 126 connected at its one axial end to the radially outer end of the disc portion 124; an outer cylindrical portion 128 located radially outwardly of the inner cylindrical portion 126; and a wall portion 130 in the form of a circular disc connecting the inner and outer cylindrical portions 126 and 128. The outer cylindrical portion 128 is located radially outwardly of and adjacent to the cylindrical portion 26b of the front cover 26.

The wall portion 130 takes the form of a circular disc having a flat wall perpendicular to the axis C. Further, an annular member 132 is attached to a radially outer part of a wall surface of the wall portion 130 which faces the fluid-operated power transmitting portion 12 in the direction of the axis C. For instance, the annular member 132 is attached to the wall portion 130 by welding.

The annular member 132 has a generally arcuate wall surface P which faces the turbine runner 22 and which follows a profile of the turbine runner 22. Namely, the wall surface of the annular member 132 which faces the turbine runner 22 has an arcuate profile which follows the convex shape of the turbine runner 22 and which extends toward the fluid-operated power transmitting portion 12 as the arcuate profile extends in the radially outward direction. Accordingly, a dimension of a gap between the turbine runner 22 and the annular member 132 in the direction of the axis C does not increase in the radially outward direction, but is kept constant in the radially outward direction. In this respect, it is noted that the annular member 132 partially overlaps with the fluid-operated power transmitting portion 12 in the direction of the axis, namely, as seen in the radial direction.

It is also noted that a distance "b" in the direction of the axis C between the fluid-operated power transmitting portion 12 and a part of the wall surface P of the annular member 132 which faces the fluid-operated power transmitting portion 12 is smaller than a distance "a" in the direction of the axis C between the wall surface P and the mass bodies 38 of the vibration damping device 14, as shown in FIG. 5. That is, b<a. In other words, the part of the wall surface P of the annular member 132 facing the fluid-operated power transmitting portion 12 in the direction of the axis C is located on one side of a midpoint H of a distance L between the fluid-operated power transmitting portion 12 and the vibration damping device 14 in the direction of the axis C, which one side is on the side of the fluid-operated power transmitting portion 12.

The annular member 132 is disposed in a space S4 formed between the fluid-operated power transmitting portion 12 and the vibration damping device 14 and occupies a part of the space S4, whereby a volume of the space S4 in which the working fluid flows is made relatively small. It is noted that the annular member 132 corresponds to a space occupying member which occupies a part of a space formed between the fluid-operated power transmitting portion 12 and the vibration damping device 14, and corresponds to an annular member attached to a cover member of the torque converter 120.

The second covering member 122b is an annular member having a bent cross sectional shape. The second covering member 122b consists of: a disc portion 134 in the form of a circular disc fixed to the disc member 36 with the rivets 48; an inner cylindrical portion 136 connected at its one axial end to the radially outer end of the disc portion 134; an outer cylindrical portion 138 located radially outwardly of the inner cylindrical portion 136; and a wall portion 140 in the form of a circular disc connecting the inner and outer cylindrical portions 136 and 138. The outer cylindrical portion 138 is located radially outwardly of and adjacent to the cylindrical portion 26b of the front cover 26. The wall portion 140 takes the form of a circular disc perpendicular to the axis C in cross section. That is, the wall portion 140 has a flat wall.

The torque converter 120 constructed as described above has the same advantages as the torque converters of the preceding embodiments. In the torque converter 120 according to the present fourth embodiment, the volume of the space S4 formed between the fluid-operated power transmitting portion 12 and the vibration damping device 14 is reduced in the presence of the annular member 132 attached to the wall portion 130 of the cover member 122, whereby the working fluid which has been moved into the radially outer portion of the torque converter 120 due to the centrifugal force when the vehicle is started after the vehicle is held stationary for a long time is forced by the annular member 132, to flow toward the fluid-operated power transmitting portion 12, since the volume of the space S4 is made relatively small. As a result, the length of time required for charging the fluid-operated power transmitting portion 12 with the working fluid can be shortened, so that the vehicle can be quickly started. In addition, the present torque converter 120 can be obtained by simply attaching the annular member 132 to the first covering member 122a of the conventional configuration, without a significant change of design with respect to the conventional torque converter.

Fifth Embodiment

Figure 6:
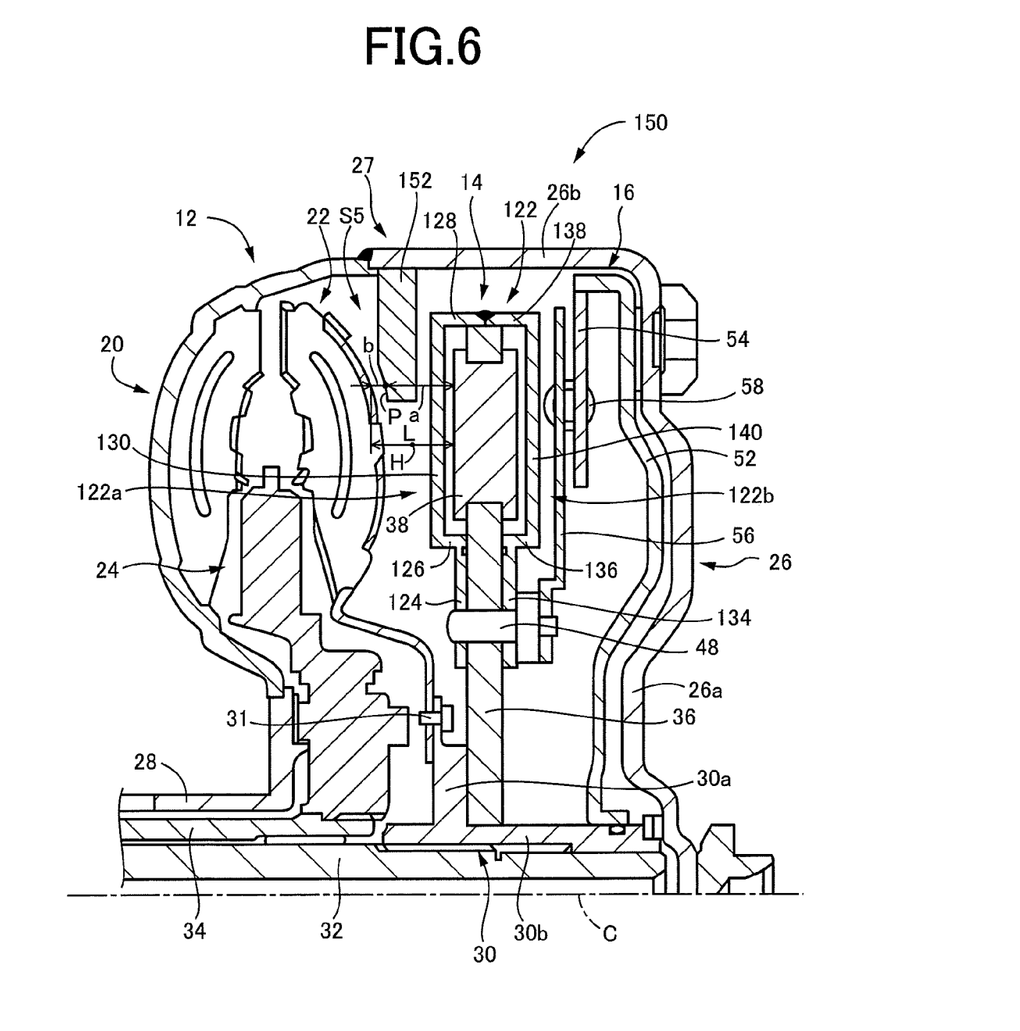
FIG. 6 is a cross sectional view of a torque converter according to a fifth embodiment of the invention.

FIG. 6 is the cross sectional view of a torque converter 150 according to a fifth embodiment of the invention. The torque converter 150 is different from the torque converter 120, in that an annular member 152 is disposed in a space S5 formed between the fluid-operated power transmitting portion 12 and the vibration damping device 14. A difference of the torque converter 150 with respect to the torque converter 120 will be described.

As shown in FIG. 6, an annular member 152 is attached to an inner circumferential surface of the cylindrical portion 26b of the front cover 26 of the housing 27. The annular member 152 is annular, having a predetermined thickness, and is attached at its outer circumferential surface to the inner circumferential surface of the cylindrical portion 26b of the front cover 26, by welding, for example. Further, a part of a wall surface P of the annular member 152 facing the turbine runner 22 has an arcuate cutout following the profile of the turbine runner 22, so that the annular member 152 partially overlaps with the turbine runner 22 in the direction of the axis C, that is, as seen in the radial direction.

It is also noted that a distance "b" in the direction of the axis C between the fluid-operated power transmitting portion 12 and a part of the wall surface P of the annular member 152 which faces the fluid-operated power transmitting portion 12 is smaller than a distance "a" in the direction of the axis C between the wall surface P and the mass bodies 38 of the vibration damping device 14, as shown in FIG. 6. That is, b<a. In other words, the part of the wall surface P of the annular member 152 facing the fluid-operated power transmitting portion 12 in the direction of the axis C is located on one side of a midpoint H of a distance L between the fluid-operated power transmitting portion 12 and the mass bodies 38 of the vibration damping device 14 in the direction of the axis C, which one side is on the side of the fluid-operated power transmitting portion 12. The annular member 152 is disposed in a space S5 formed between the fluid-operated power transmitting portion 12 and the vibration damping device 14, whereby a volume of the space S5 in which the working fluid flows is made relatively small. It is noted that the annular member 152 corresponds to an annular member attached to a housing of the torque converter 150, namely, a space occupying member which occupies a part of a space formed between the fluid-operated power transmitting portion 12 and the vibration damping device 14.

The torque converter 150 constructed as described above has the same advantages as the torque converters of the preceding embodiments. In the torque converter 150 according to the present fifth embodiment, the volume of the space S5 formed between the fluid-operated power transmitting portion 12 and the vibration damping device 14 is reduced in the presence of the annular member 152, whereby the working fluid which has been moved into the radially outer portion of the torque converter 150 due to the centrifugal force when the vehicle is started after the vehicle is held stationary for a long time is forced by the annular member 152, to flow toward the fluid-operated power transmitting portion 12, since the volume of the space S5 is made relatively small. As a result, the length of time required for charging the fluid-operated power transmitting portion 12 with the working fluid can be shortened, so that the vehicle can be quickly started.

While the preferred embodiments of this invention have been described in detail by reference to the drawings, it is to be understood that the invention may be otherwise embodied.

For example, the present invention is not limited to the specific forms of the illustrated individual embodiments, independently of each other, but may be embodied in the form of desired combinations of features of the illustrated embodiments. For instance, annular members may be attached to both of the front cover 26 and the cover member 122. Alternatively, at least one annular member may be attached to the cover member which has a convex portion projecting toward the fluid-operated power transmitting portion 12 in the direction of the axis C.

In the torque converter 10 according to the first embodiment, the distance "b" in the direction of the axis C between the fluid-operated power transmitting portion 12 and a part of the wall surface P of the wall portion 66 of the cover member 46 which faces the fluid-operated power transmitting portion 12 is smaller than the distance "a" in the direction of the axis C between the part of the wall surface P and the mass bodies 38 of the vibration damping device 14. However, the distance "b" may be a distance between any part of the wall surface P and the fluid-operated power transmitting portion 12. That is, the present invention requires that the distance "b" between at least a part of the wall surface P and the fluid-operated power transmitting portion 12 is smaller than the distance "a". This is true in the torque converters 80, 100, 120 and 150 according to the second through fifth embodiments of the invention, and in torque converters 160 and 170 according to sixth and seventh embodiments which will be described.

In the torque converter 10 according to the illustrated first embodiment, the volume of the space S1 in which the working fluid flows is reduced by suitably designing the shape of the cover member 46 which covers or protects the vibration damping device 14. However, the volume of the space S1 may be reduced by increasing the thickness of the cover member 46.

In the torque converter 150 according to the fourth embodiment, the annular member 152 is attached to the front cover 26. However, the annular member 152 may be attached to the pump impeller 20, or to both of the front cover 26 and the pump impeller 20.

The cover members 46, 82 and 102 in the first, second and third embodiments have specific geometrical configurations, which are given for illustrative purpose only. However, the geometrical configurations of the cover members 46, 82 and 102 may be modified as long as the distance "b" between the part of the wall surface P of the wall portion 66, 90 and 110 and the fluid-operated power transmitting portion 12 is made smaller than the distance "a" between the part of the wall surface P of the wall portion 66, 90 and 110 and the mass bodies 38 of the vibration damping device 14, so that the volume of the space S1, S2 or S3 is reduced. The wall portion 66 of the first covering member 46a has an arcuate profile as a whole. However, the wall portion 66 may have a partially arcuate profile. Further, the wall portion 90 of the first covering member 82a of the cover member 82, which has only one curved part 92, may be replaced by a wall portion having a plurality of curved parts.

Figure 7:
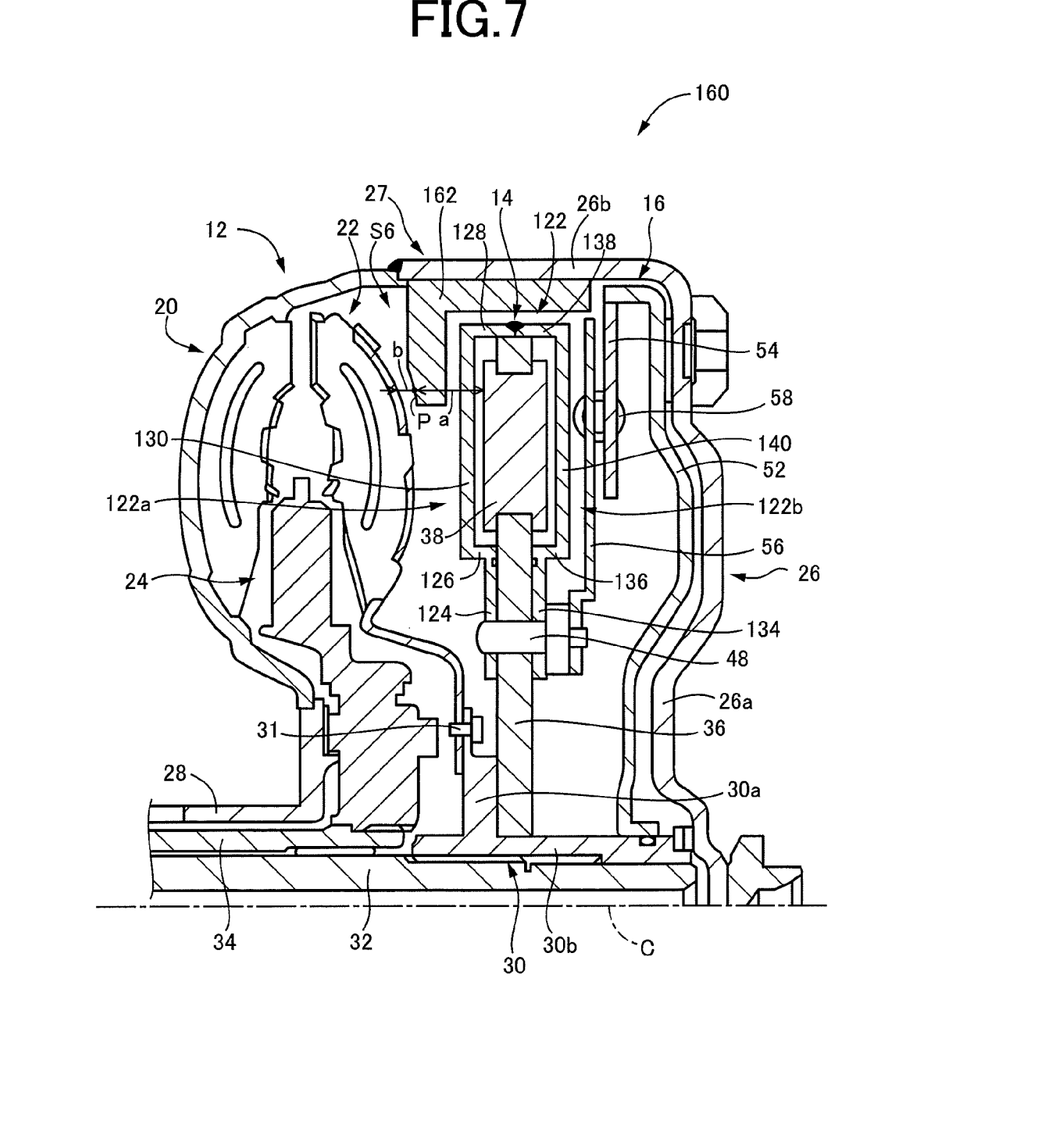
FIG. 7 is a cross sectional view of a torque converter according to a sixth embodiment of the invention.

The annular members 132 and 152 in the fourth and fifth embodiments have specific geometrical configurations, which are given for illustrative purpose only. However, the geometrical configurations of the annular members 132 and 152 may be modified as long as the distance "b" in the direction of the axis C between the fluid-operated power transmitting portion 12 and the part of the wall surface P of the annular member 132, 152 which faces the fluid-operated power transmitting portion 12 is made smaller than the distance "a" between the wall surface P and the vibration damping device 14, so that the volume of the space S4 or S5 is reduced. For instance, a torque converter 160 according to a sixth embodiment of the invention shown in FIG. 7 is configured such that an annular member 162 which is L-shaped in cross section is attached to the inner circumferential surface of the cylindrical portion 26b of the front cover 26, so that a volume of a space S6 is reduced.

Figure 8:
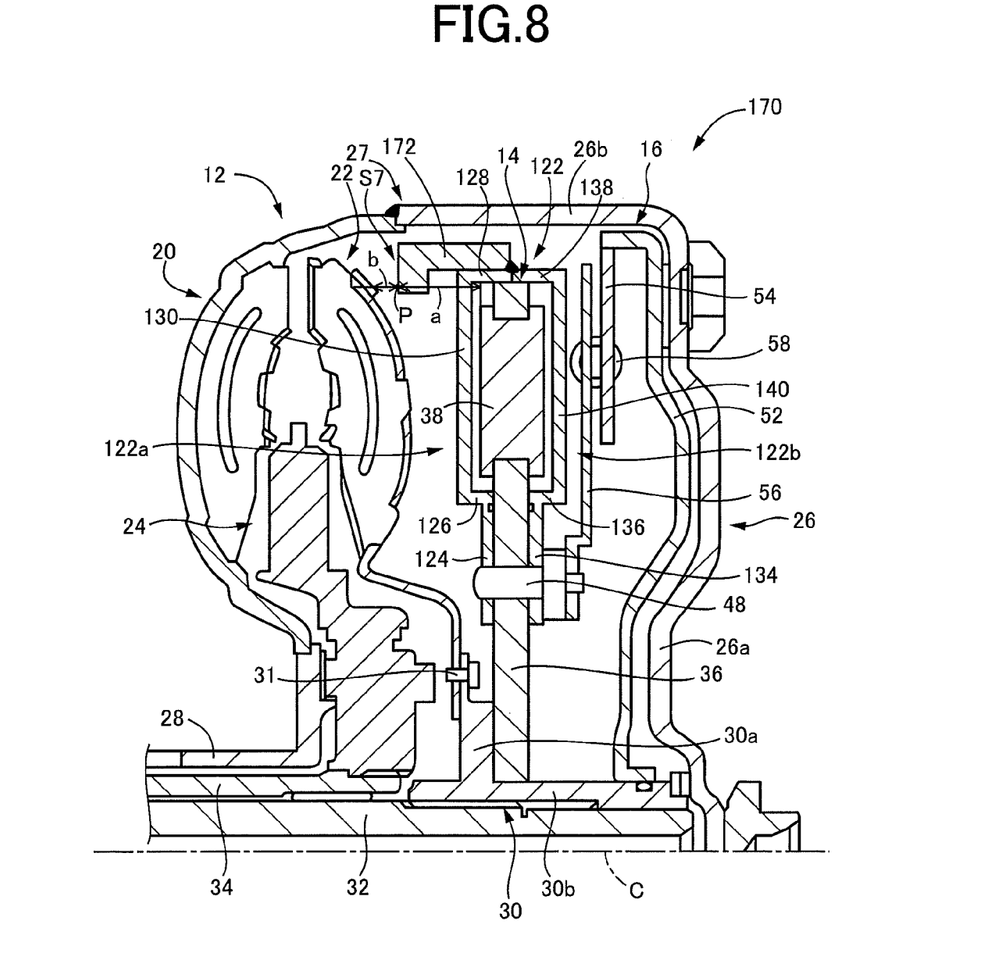
FIG. 8 is a cross sectional view of a torque converter according to a seventh embodiment of the invention.

The annular member 132 in the fourth embodiment is attached to the wall portion 130. However, an annular member 172 may be attached to the outer cylindrical portion 128 of the cover member 122, so that a volume of a space S7 is reduced, as in a torque converter 170 shown in FIG. 8, for example. In the torque converter 170 of FIG. 8 according to a seventh embodiment of the invention, too, the distance "b" between the wall surface P of the annular member 172 facing the fluid-operated power transmitting portion 12 in the direction of the axis C and the fluid-operated power transmitting portion 12 is made smaller than the distance "a" between the wall surface P and the vibration damping device 14 in the direction of the axis C, so that the volume of the space S7 in which the working fluid flows is reduced, whereby the fluid-operated power transmitting portion 12 can be charged in a short time when the vehicle is started after the vehicle is held stationary for a long time.

While the fourth through seventh embodiments use the respective annular members 132, 152, 162 and 172 which are formed continuously over the entire circumference of the torque converters 120, 150, 160 and 170, each of these annular members 132, 152, 162 and 172 may be replaced by a plurality of arcuate pieces which are spaced apart from other in the circumferential direction of the torque converter.

While the preferred embodiments and the modifications have been described above for illustrative purpose only, it is to be understood that the invention may be embodied with various other changes and improvements, which may occur to those skilled in the art.

NOMENCLATURE OF ELEMENTS

10, 80, 100, 120, 150, 160, 170: Torque converter
12: Fluid-operated power transmitting portion
14: Vibration damping device
20: Pump impeller
22: Turbine runner
22a: Convex part (Convex part of fluid-operated power transmitting portion)
27: Housing
36: Disc member
38: Mass bodies
40: Guide holes
46, 82, 102: Cover member
66, 90, 110: Wall portion (Part of cover member; Space occupying member)
67: Concave part
122: Cover member
130: Wall portion (part of cover member)
132, 152, 162, 172: Annular member (Space occupying member)
S1-S7: Space
P: Wall surface (Wall surface of space occupying member facing fluid-operated power transmitting portion in axial direction)
a: Distance (axial distance between wall surface and vibration damping device)
b: Distance or spacing (axial distance or spacing between wall surface and fluid-operated power transmitting portion)
c: Distance or spacing (axial distance or spacing between wall portion and vibration damping device)

What is claimed is:

1. A torque converter configured to transmit a torque, comprising:
   a housing;
   a fluid-operated power transmitting portion and a vibration damping device which are each accommodated within the housing and which are disposed around an axis such that the vibration damping device is located adjacent to the fluid-operated power transmitting portion in a direction of the axis;
   a clutch configured to transmit at least a portion of the torque; and
   a space occupying member which occupies a part of a space formed within the housing and between the fluid-operated power transmitting portion and the vibration damping device,
   wherein the vibration damping device is between the fluid-operated power transmitting portion and the clutch in the direction of the axis,
   wherein the space occupying member includes a wall surface facing the fluid-operated power transmitting portion in the direction of the axis,
   wherein a distance in the direction of the axis between a part of the wall surface and the fluid-operated power transmitting portion is smaller than a distance in the direction of the axis between the part of the wall surface and the vibration damping device, and
   wherein the vibration damping device includes guide holes and a plurality of mass bodies arranged in the guide holes, the mass bodies configured to move within the guide holes to dampen a vibration of the torque.

2. The torque converter according to claim 1, wherein the space occupying member is a wall portion which is a part of a cover member covering the vibration damping device, and the wall portion has a concave part recessed in the direction of the axis toward the vibration damping device, so as to accommodate a convex part of the fluid-operated power transmitting portion which projects in the direction of the axis toward the vibration damping device.

3. The torque converter according to claim 1, wherein the space occupying member is a wall portion which is a part of a cover member covering the vibration damping device, and a distance in the direction of the axis between the part of the wall surface and the fluid-operated power transmitting portion is smaller than a distance in the direction of the axis between a part of the wall portion and the vibration damping device.

4. The torque converter according to claim 3, wherein the wall portion at least partially overlaps with the fluid-operated power transmitting portion in a radial direction of the fluid-operated power transmitting portion.

5. The torque converter according to claim 4, wherein the fluid-operated power transmitting portion has a convex part projecting in the direction of the axis toward the vibration damping device, and the wall portion has a concave part recessed in the direction of the axis toward the vibration damping device to accommodate the convex part.

6. The torque converter according to claim 1, wherein the space occupying member is an annular member attached to a cover member covering the vibration damping device.

7. The torque converter according to claim 6, wherein the annular member is attached to a wall portion of the cover member, the wall portion faces the fluid-operated power transmitting portion in the direction of the axis, and the annular member at least partially overlaps with the fluid-operated power transmitting portion in a radial direction of the fluid-operated power transmitting portion.

8. The torque converter according to claim 1, wherein the space occupying member is an annular member attached to the housing which accommodates the fluid-operated power transmitting portion and the vibration damping device.

9. The torque converter according to claim 1,
wherein the fluid-operated power transmitting portion includes a pump impeller, and a turbine runner which is disposed so as to face the pump impeller in the direction of the axis such that the turbine runner is rotatable relative to the pump impeller,
wherein the vibration damping device includes a disc member which is rotated together with the turbine runner, and
wherein the disc member has the guide holes, and each of the mass bodies is held in engagement with a corresponding one of the guide holes such that each mass body can be oscillated within the corresponding guide hole in a circumferential direction of the disc member.

10. The torque converter according to claim 1,
wherein a distance in the direction of the axis between a radially outer part of the wall surface and the fluid-operated power transmitting portion is smaller than a distance in the direction of the axis between the radially outer part of the wall surface and the vibration damping device.

11. The torque converter according to claim 1,
wherein a distance in the direction of the axis between the wall surface and the fluid-operated power transmitting portion is smaller than a distance in the direction of the axis between the wall surface and the vibration damping device.

* * * * *